United States Patent [19]

Logie et al.

[11] 4,329,717
[45] May 11, 1982

[54] FACSIMILE METHOD AND APPARATUS FOR SETTING WHITE LEVEL

[75] Inventors: James A. Logie, Orlando; Arthur G. Wilson, Maitland, both of Fla.

[73] Assignee: Exxon Research & Engineering Co., Florham Park, N.J.

[21] Appl. No.: 120,340

[22] Filed: Feb. 11, 1980

[51] Int. Cl.³ .............................................. H04N 1/40
[52] U.S. Cl. ........................ 358/282; 340/146.3 AG; 358/280
[58] Field of Search .............................. 358/282, 280; 340/146.3 AG, 146.3 AH

[56] References Cited

U.S. PATENT DOCUMENTS 4,133,008  1/1979  Tisue ................................... 358/282

OTHER PUBLICATIONS

*IBM Technical Disclosure Bulletin*, vol. 21, No. 1, Jun. 1978, pp. 113-114.

*Primary Examiner*—Howard Britton
*Attorney, Agent, or Firm*—Norman L. Norris; Dale Heist

[57] ABSTRACT

A facsimile method and apparatus wherein the white level is set during prescanning in one direction from a first extremity to a second extremity of a document. Scanning then proceeds with the white level set in a second direction from the second extremity to the first extremity. The white level is set using variable gain amplifier means comprising a digital-to-analog converter and gain control means comprising a digital register which stores a binary word representing the whitest level sensed during prescanning in the first direction.

12 Claims, 3 Drawing Figures

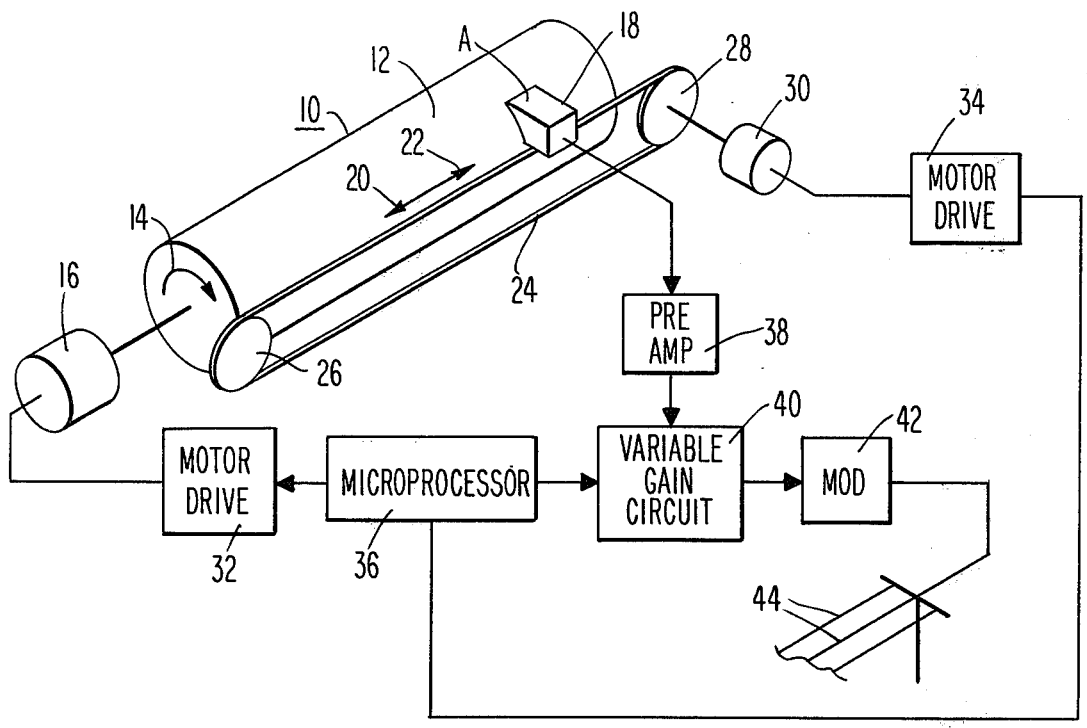
Fig. 1
Fig. 1a
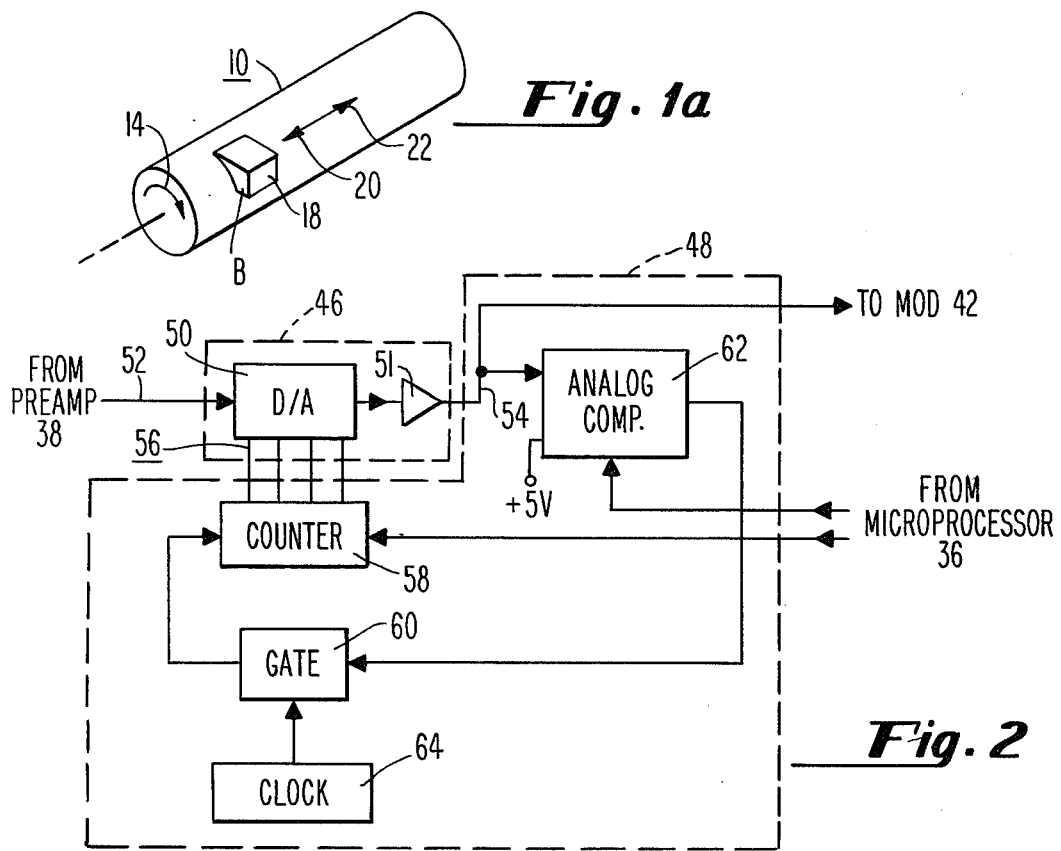
Fig. 2

FACSIMILE METHOD AND APPARATUS FOR SETTING WHITE LEVEL

BACKGROUND OF THE INVENTION

This invention relates to facsimile transmitters and/or transceivers of the type utilized to transmit information-bearing signals representing the dark/light variations on a document located at a transmitter or transceiver and converting the information-bearing signals to marks or images on a copy medium located at a receiver so as to form a copy which is a reasonable facsimile of the original document.

It is common in facsimile apparatus to set a predetermined voltage or current level which represents white on a document. Typically, this predetermined voltage or current level is set at the factory. However, as the light source of a scanner ages, the scanner phototransistor ages and the alignment between light source and phototransistor changes, the magnitude of the predetermined voltage or current level will vary and the preset light level will no longer be appropriate.

Heretofore, it has been suggested that the document should be preliminarily scanned so as to determine characteristics so as to appropriately set the white gain of the transmitter amplifier means. However, such preliminary scanning can be time consuming, and the consumption of time can be extremely undesirable in unattended facsimile transmitters wherein the time consumed between transmissions should be minimized. Moreover, the gain itself in prior art facsimile transmitters may be subject to some drift even over a relatively short period corresponding to the time required to scan a single document.

In general, it is desirable to achieve the maximum output from a facsimile transmitter which is allowed by the rules and regulations of the FCC for purposes of transmission over the telephone network. In a typical facsimile transmitter, the output from the transmitter when set at the factory may not be maximized for a given document. In other words, a given document may have a characteristic which will not permit the full output of the transmitter to be utilized.

SUMMARY OF THE INVENTION

It is an object of this invention to provide a facsimile transmission method and apparatus which is substantially independent of the aging of light sources, optics, phototransistors or other sensor and the alignment between the light sources and phototransistors.

It is a more specific object of this invention to provide a facsimile transmission method and apparatus which is adaptive to a particular document being transmitted.

It is another object of this invention to achieve the foregoing objects without creating undesirable delays.

It is a further object of this invention to achieve the foregoing objects in a reliable manner.

In accordance with these and other objects of the invention, a facsimile transmission apparatus comprises scanning means for scanning a document, sensor means for sensing dark/light variations on a document and variable gain amplifier means.

Prior to transmission, prescanning is initiated with the scanning means in an initial position. The document is prescanned from the first direction toward a second position. During prescanning, the gain of the variable gain amplifier means is set. Once the scanning means has reached a second position, scanning may proceed in a second and opposite direction from the second scanning means toward the first scanning means. During scanning, amplified signals are generated by the variable gain amplifier means representing the dark/light variations in the document.

In the preferred embodiment of the invention, the first position of the scanning means is at one extremity of the document and the second position is at the second extremity of the document.

In accordance with another important aspect of the invention, a binary word is stored representing the gain of the variable gain amplifier means during prescanning. This binary word may be updated and changed during prescanning as various levels of white are detected.

In the preferred embodiment of the invention, the variable gain amplifier means are utilized in combination with gain control means. The gain control means comprises a register which stores the binary word representing the gain. The variable gain amplifier means comprises an digital-to-analog converter having an analog input, a digital input and an analog output. The analog input is coupled to the sensor means. The digital input is coupled to the digital register. The output from the digital-to-analog converter is a signal representing the product of the binary word and the signal applied to the analog input.

In the preferred embodiment, the gain control means may comprise means for generating pulses and gate means for selectively applying the pulses to the register means during prescanning when the output of the digital-to-analog converter exceeds a predetermined level corresponding to a white level set. The gain control means may further comprise comparator means having one input coupled to the output of the analog-to-digital converter, another input coupled to a reference voltage and an output coupled to and enabling the gate means.

BRIEF DESCRIPTION OF THE DRAWINGS

FIG. 1 is a partially schematic block diagram illustrating a preferred embodiment of the invention;

FIG. 1a is a partial perspective view of the scanning means shown in FIG. 1 in another position; and FIG. 2 is a block diagram of the variable gain circuit shown in FIG. 1.

DETAILED DESCRIPTION OF A PREFERRED EMBODIMENT

Referring to FIG. 1, a facsimile transmitter or a transmission portion of a facsimile transceiver is shown as comprising a scanning means 10 including a rotatable drum 12 capable of rotation in a direction indicated by an arrow 14 when driven by a motor 16. A head 18 is juxtaposed to the drum 12 and moves in both of two rectilinear directions as depicted by arrowheads 20 and 22. The head which includes suitable optical means for sensing dark/light variations in a document carried by the drum 12 is mounted on a belt 24 which moves around pulleys 26 and 28 when the pulleys are advanced by a motor 30. The motors 16 and 30 are both connected to motor drive circuitry 32 and 34 respectively which are under the control of a microprocessor 36.

As mentioned above, the head 18 includes optics for detecting dark/light variations. These optics are coupled to suitable sensors such as a phototransistor which generates a signal representing the dark/light variations which is applied to a preamplifier 38 having an output coupled to a variable gain circuit 40. The output from the variable gain circuit 40 is coupled to a modulator 42 which may be of the FM type. In the alternative, the modulator 42 may be of the AM/FM type, both types being consistent with CCITT Standards. The output from the modulator 42 is then applied either acoustically or directly to a communication network depicted by telephone lines 44.

In accordance with one very important aspect of this invention, the head 18 is located in a first or home position A as shown in FIG. 1 prior to any transmission. The head 18 is then free to move in a first direction 20 during prescanning at which time the dark/light variations in a document are detected so as to enable the variable gain circuit 40 to achieve a top or white level set. At the conclusion of prescanning, the head 18 has reached a second position B from which it begins a scanning motion in the direction 22 as shown in FIG. 1a.

From the foregoing, it will be appreciated that the time consumed between facsimile transmissions may be minimized. In this regard, it will be understood that the head 18 will be returned to the home position A during scanning. As a result, the prescanning motion in the direction 20 which carries the head 18 back to the position B in preparation for scanning is itself utilized to set the gain of the variable gain circuit 40, and there is no lost motion of the head 18. In addition the prescanning motion takes place at a speed greater than its speed during transmission. This particular feature becomes particularly important in an unattended operation wherein it is desirable to transmit as many documents as possible within a predetermined length of time with a minimum amount of time lost between transmissions. While it is true that the prescanning motion in the direction 20 is not utilized to actually generate meaningful transmission information, it is utilized to appropriately set the gain of the variable gain circuit 40 to optimize the facsimile transmission.

Variable gain circuit 40 will now be described in detail with reference to FIG. 2. The circuit 40 may be considered as comprising a variable gain amplifier means 46 and a gain control means 48. In accordance with one important aspect of the invention, the variable gain amplifier means 46 comprises a digital-to-analog converter 50 having an analog input 52, analog output 54 and a digital input 56 and an amplifier means 51 responsive to the digital-to-analog converter. An eight bit binary word is applied to the digital input 56 to set the gain for the converter 50 where the gain is equal to the product of the analog input signal applied to the input 52 and the binary word applied to the input 56. In other words, the D/A converter 50 is a multiplying converter such as the LMDAC08CJ manufactured by National Semiconductor.

The eight bit binary word applied to the digital input 56 is stored in a register or counter 58 which has an input coupled to a gate 60. When the gate 60 is enabled by the output of an analog comparator 62, clock pulses generated by a clock source 64 pass through the gate 60 to the counter 58 and the binary word displayed at the output of the counter is then applied to the input 56 of the D/A converter 50 will increment respond.

In accordance with this invention, the gate 60 is enabled whenever the analog output 54 from the variable gain amplifier 46 exceeds a +5 volts which is the reference voltage applied to another input of the analog comparator 62. This will occur whenever the white level as detected during prescanning of the head 18 in the direction 20 as shown in FIGS. 1 and 1a exceeds the whitest level previously detected. This resulting increase in the counter 58 changes the multiplier value applied to the D/A converter 50 and in effect reduces the gain of the variable gain amplifier means 40.

In accordance with this invention, the analog comparator 62 is only enabled by the microprocessor 36 when the head 18 is moving in the prescanning direction 20. In other words, there is no analog comparator output as the head 18 moves in the scanning direction 22. It will also be appreciated that the counter 58 is reset by the microprocessor 36 as soon as the head 18 reaches the home position A so as to prepare the variable gain circuit 40 to preset a new white level for the next document to be transmitted.

As mentioned previously, the invention is particularly applicable to unattended transmitters. Such a transmitter is shown in copending application Ser. No. 120,317 filed Feb. 11, 1980 which is incorporated herein by reference.

Although a particular embodiment has been shown and described, it will be appreciated that other embodiments will occur to those of ordinary skill in the art which will fall within the true spirit and scope of the invention as set forth in the appended claims.

What is claimed is:

1. Facsimile apparatus for transmitting facsimile signals comprising:
    scanning means for scanning a document from one extremity to another extremity and prescanning said document from said other extremity to said one extremity;
    sensor means for sensing the document located at said scanning means for sensing dark/light variations in said document;
    variable gain amplifier means coupled to said sensor means; and
    gain control means for setting said variable gain during said prescanning.

2. The facsimile apparatus of claim 1 wherein said gain control means comprises register means for storing a binary word representing the gain.

3. The facsimile apparatus of claim 2 wherein said variable gain amplifier means comprises an digital-to-analog converter comprising an analog input, a digital input and an analog output, said analog input coupled to said sensor means, said digital input coupled to said register means, said output generating a signal representing the product of said binary word and a signal applied to the analog input and an amplifier means responsive to said digital-to-analog converter.

4. The facsimile appartus of claim 3 wherein said gain control means includes means for generating pulses and gate means for selectively applying said pulses to said register means during prescanning when the output of said variable gain amplifier exceeds a predetermined level corresponding to a previous white level set.

5. The facsimile apparatus of claim 4 wherein said gain control means comprises means having one input coupled to the output of said digital-to-analog converter, another input coupled to a reference voltage and an output coupled to and enabling said gate means.

6. A facsimile apparatus for transmitting facsimile signals comprising:
    scanning means for scanning a document;
    sensor means located at said scanning means for sensing dark/light variations in said document;

variable gain amplifier means coupled to said sensor means, said variable gain amplifier means including a digital-to-analog converter and an amplifier means responsive thereto, said digital-to-analog converter having an analog input, a digital input and an analog output, the analog input being coupled to said sensor means; and gain control means for setting said variable gain, said gain control means comprising register means for storing a binary word representing the gain, said register means being coupled to the digital input of said digital-to-analog converter, the output of said converter being a signal representing the product of said analog input and said binary word, said gain control means further including means for generating pulses and gate means for selectively applying said pulses to said register means during prescanning when the output of said digital-to-analog converter exceeds a predetermined level corresponding to a previous white level set.

7. The facsimile apparatus of claim 6 wherein said gain control means comprises means having one input coupled to the output of said digital-to-analog converter, another input coupled to a reference voltage and an output coupled to and enabling said gate means.

8. A method of operating a facsimile transmitter comprising scanning means for scanning a document, sensor means for sensing dark/light variations on a document and variable gain amplifier means, the method comprising the following steps:

initiating prescanning with the scanning means in a first position;

prescanning the document in a first direction toward a second position;

setting the gain of the variable gain amplifier means while prescanning the document;

scanning the document in a second and opposite direction from the second position toward the first position; and generating amplified signals representing dark/light variations while scanning in the second direction.

9. The method of claim 8 wherein the first position is at one extremity of the document and the second position is is at a second extremity of the document.

10. The method of claim 8 including the step of storing a binary word representing the gain during scanning.

11. The method of claim 10 including the step of updating the binary word during prescanning and fixing the binary word during scanning.

12. A method of operating a facsimile transmitter comprising scanning means for scanning a document in a first direction and in a second direction transverse thereto, sensor means for sensing dark/light variations on a document and variable gain amplifier means, the method comprising the following steps:

prescanning the document in said first direction;

setting the gain of the variable gain amplifier means while prescanning the document;

scanning the document in said first and in said second directions after said prescanning has been completed; and generating amplified signals representing dark/light variations during said scanning step.

* * * * *